July 29, 1924.

K. SCHRAGIN 1,503,432

METHOD OF MANUFACTURING SELF COOLING TIRES

Filed Dec. 22, 1923   3 Sheets—Sheet 1

INVENTOR.
Kuno Schragin.
By William C. Linton
ATTORNEY.

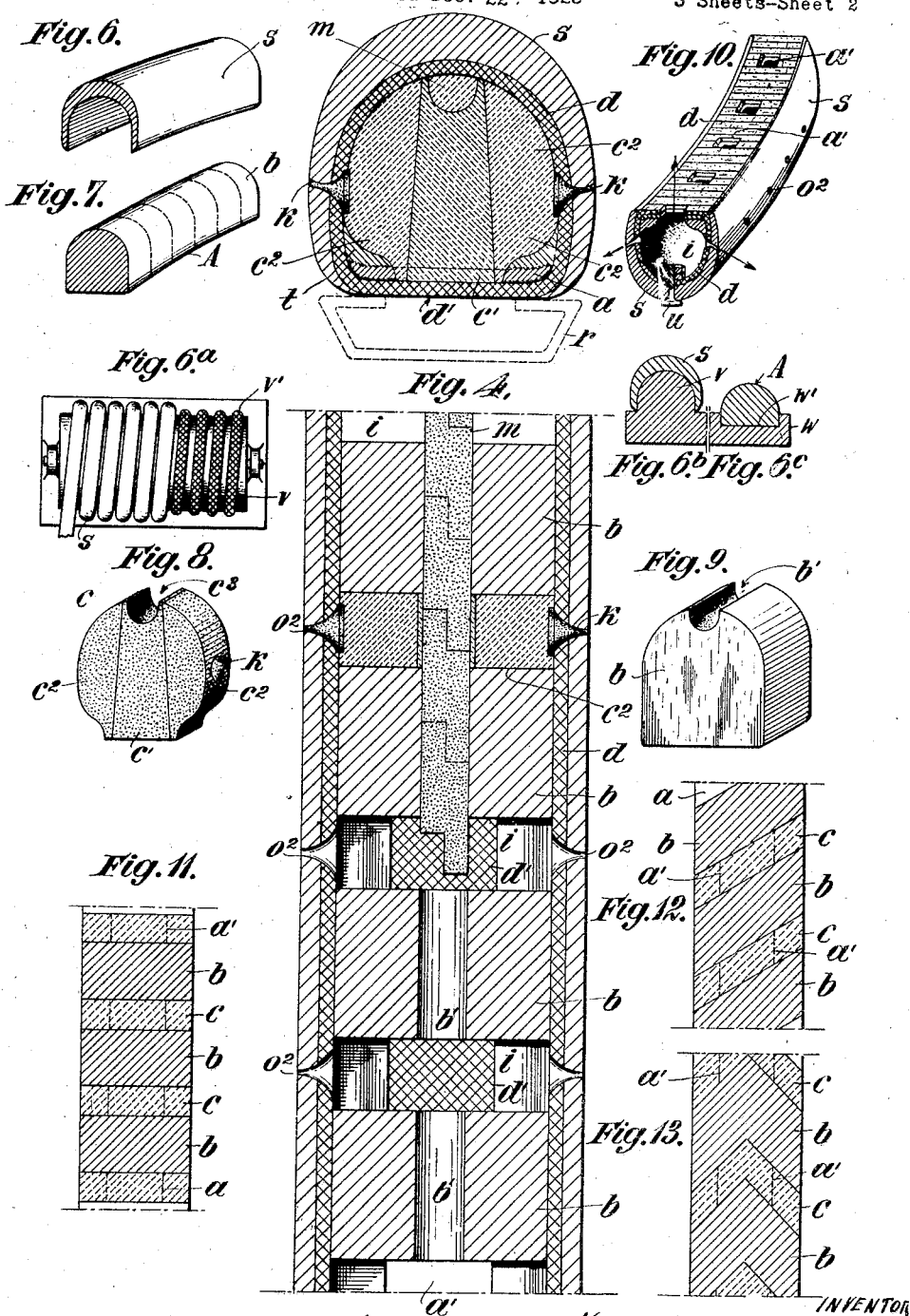

Patented July 29, 1924.

1,503,432

UNITED STATES PATENT OFFICE.

KUNO SCHRAGIN, OF BERLIN, GERMANY.

METHOD OF MANUFACTURING SELF-COOLING TIRES.

Application filed December 22, 1923. Serial No. 682,322.

*To all whom it may concern:*

Be it known that I, KUNO SCHRAGIN, a citizen of Russia, and resident of Berlin, Germany, have invented a new and useful Method of Manufacturing Self - Cooling Tires, of which the following is a specification.

This invention relates to tires for vehicles, such as motor-cars and the like; more especially it relates to a method of manufacturing self-cooling tires without air-tube, and the gist of my invention consists in attaching spaced solid rubber bodies to a metal ring provided with spaced apertures, said bodies being located between said apertures; filling up the spaces between the solid rubber-bodies with shaping-members bridging said apertures; enclosing the whole in an outer cover, or, by way of modification, first in an inner cover forming a kind of bandage and being impregnated with rubber, and then in the outer cover; vulcanizing the thus obtained annular body; providing in either the single cover or the double one, as the case may be, apertures coinciding with those of the metal-ring; and removing the shaping bodies through these apertures so as to form chambers in the thus produced tire. Besides these general features special ones consist in channels or passages connecting said chambers with each other inside the tire, and in some other contrivances fully described hereinafter. Owing to the provision of the chambers and their communications with each other, as well as with the outer air through the apertures of the said metal-ring, the air in the tire chambers is constantly exchanged while the tire is running, and this latter is, therefore, strongly cooled during that time.

This new method offers essential advantages in several respects over the known methods for the manufacture of tires without air-tubes. The manner of manufacturing them is remarkably simple and easy so that by far less time is required. If a bandage is used and the outer tire extends only to, or a little below, the rims of the metal ring, the bandage envelops also this ring and fastens all solid rubber bodies and the shaping-bodies in their proper position relatively to each other, as well as to the metal ring, so that they do not change either their places or their shapes while the vulcanization takes place. Besides, the tire is greatly reinforced by the bandage, especially after the vulcanization, so that it is apt to stand the greatest strains occurring in the practical employment. Another important advantage over the known tires of the kind mentioned resides therein that the exchange of the air proceeds very quickly whereby the tire is constantly strongly cooled.

My invention is illustrated, by way of example, in the accompanying drawing in which Figure 1 shows an improved self-cooling tire without air-tube partly in side-view (upper part of lefthand side), partly in section (upper part of righthand side), and partly after the outer cover has been removed (lower half), the upper part of the righthand side showing two stages of the tire, viz. the shaping members being still in place (lower part of the section) and these members being removed (upper part of the section), as is more fully described hereinafter.

Figure 4 is a cross-section through the complete tire, including its contents, prior to its vulcanization, the scale of the figure being still larger than that shown in Figure 3.

Figure 5 is a longitudinal section through a portion of the tire which is stretched out horizontally, the plane of the section lying in the middle of Figure 4, and the scale of the figure being also that of Figure 4.

Figure 6 is a perspective representation of a piece of the outer cover.

Figure 7 is a similar illustration showing a piece of rubber which is to be cut (as indicated by the dotted lines) in order to be converted into the solid rubber parts which are to be attached to the metal ring mentioned above.

Figures $6^a$, $6^b$, and $6^c$, show accessories relating to the storing of the outer cover (Fig. 6) and of the solid rubber bar (Fig. 7), Figures $6^b$ and $6^c$ being drawn to a greatly enlarged scale relatively to Figure $6^a$.

Figure 8 is a perspective illustration of one of the shaping members for the chambers to be formed in the tire.

Figure 9 is a similar illustration showing one of the rubber pieces between which the chambers are formed.

Figure 1:
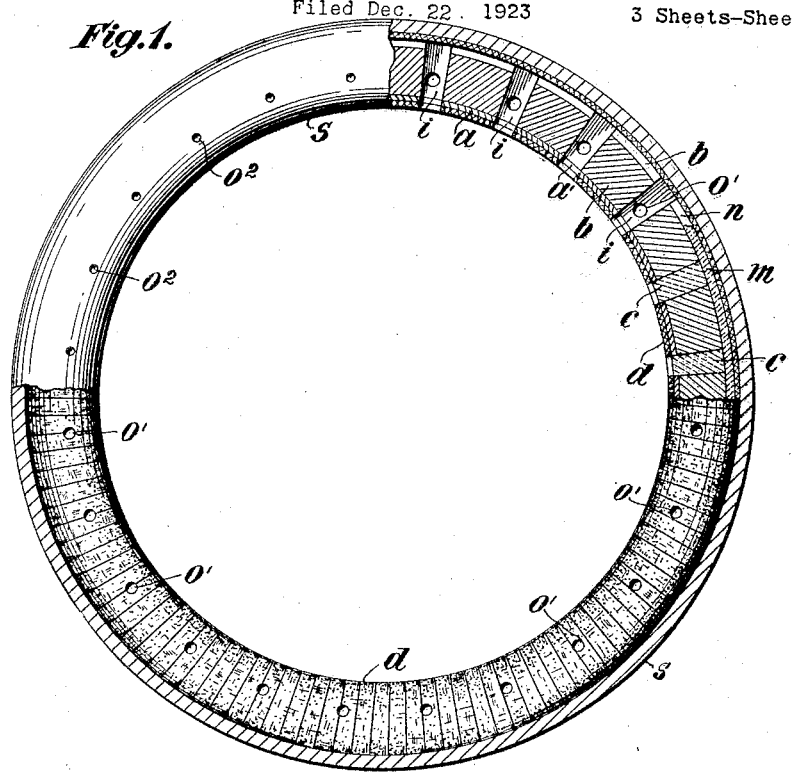
Figure 2:
Figure 2 is a horizontal section of the tire in the plane of the tire-axis, the outer cover being omitted.

Figure 10 is a perspective illustration of a part of the finished tire, the scale being that of Figures 1 and 2.

Figure 11 is a schematic view showing one form of arranging the filler.

Figure 12 is a similar view showing a slightly modified form of arranging the filler.

Figure 13 is a like view of a still further modified form of arranging the filler.

Figure 14:
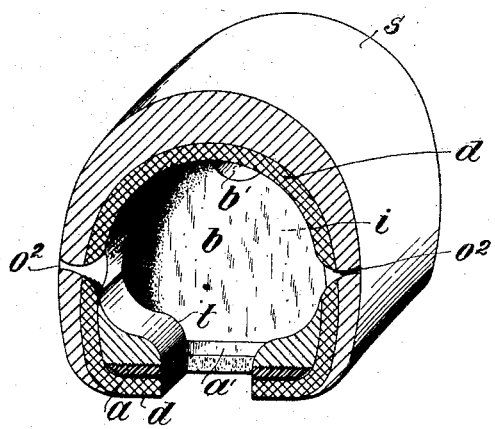

Figure 14 is an illustration similar to Figure 10, showing also a perspective representation of a portion of the tire, but on the scale of Figure 4.

Figure 15:
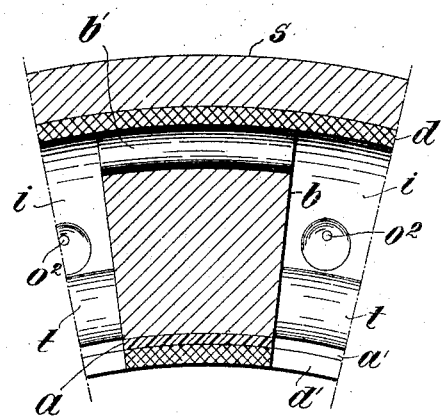

Figure 15 is a longitudinal cross section of Figure 14.

Figure 16:
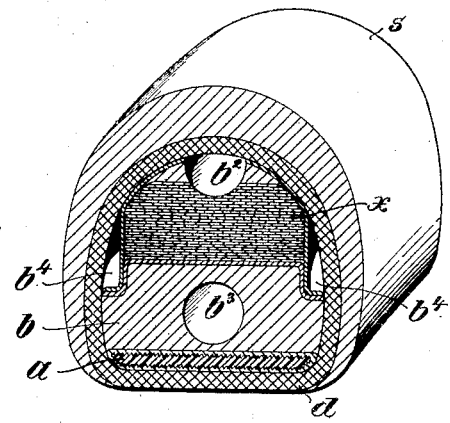
Figure 17:
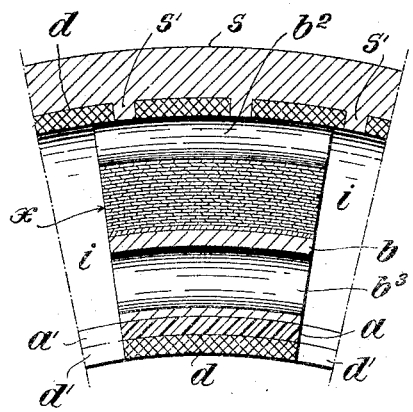

Figure 16 is an illustration similar to Figure 14, but showing a modification, and Figure 17 is a longitudinal cross section of Figure 16.

The metal ring $a$ (Figs. 1, 3, 14, 15) is provided with equally spaced apertures $a'$ (Figs. 14 and 15), preferably of quadrangular or square shape, between which are located solid rubber-pieces $b$ (Figs. 3 and 9) secured to the ring by any suitable means, for instance an adhesive medium. These rubber pieces are produced, preferably, by severing them from a rubber bar A (Fig. 7), as indicated by the dotted lines in this figure.

Between the rubber pieces $b$ shaping members or bodies $c$ (Figures 1 and 11) are inserted. The shape of these parts $b$ and $c$ in radial direction is such that the circumference is completely filled up. In the example shown in Figures 3, 4, and 8, each shaping body consists of three parts $c^2$, $c^1$, $c^2$, each of which can be withdrawn through the aperture $a'$ located below the respective part $c^1$. When this central part has been withdrawn, first one of the lateral parts $c^2$ and then the other thereof can also be removed through the respective aperture. This is effected, however, only after the vulcanization has taken place and has been finished, as is again referred to hereinafter.

Figure 3:
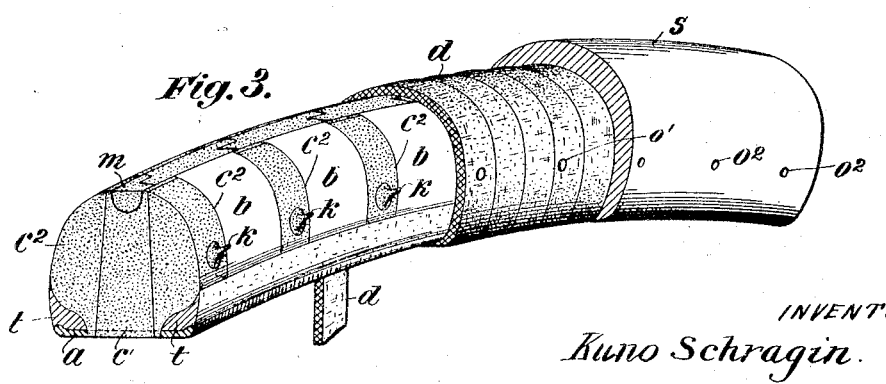
Figure 3 is a perspective illustration of a part of the tire and of the various stages of manufacturing it, the figure being drawn to an enlarged scale.

Each rubber piece $b$ is provided with a groove $b'$ (Fig. 9) located at its outer end, and a similar groove $c^3$ (Fig. 8) is provided in the central member $c^1$ of each shaping body. The individual grooves which form, in their entirety, a continuous groove extending around the circumference of the tire receive ledge-like members $m$ (Figures 3, 4 and 5) filling up the continuous circumferential groove (Fig. 3). The object of these members $m$ will be described hereinafter.

Each lateral part $c^2$ of the shaping bodies is provided laterally with a conical or funnel-shaped projection $k$ (Figs. 3, 4, 5, and 8).

The metal-ring $a$ is encompassed by two spaced parallel strips or rings $t$ (Figs. 3, 4, and 14) of ebonite. The space between these strips or rings corresponds to the width of the apertures $a'$ (Fig. 14). Each rubber piece $b$ bears with the middle part of its bottom on the metal ring $a$, between two apertures $a'$, and with the lateral part of its bottom on said rings or strips $t$. The inserted members bear solely on these rings or strips, as below their middle parts $c'$ are the said apertures $a'$.

The parts described up to this part of the specification having been assembled in the manner shown in the lefthand part of Figure 3, a textile strip $d$ (Figs. 1–5) impregnated with rubber or the like is wound around the assembled parts $a$, $b$, and $c$ (or $c^2$, $c^1$, $c^2$ respectively), the strip $d$ forming a kind of bandage for them. Then the outer cover $s$ is placed on the bandage $d$, and the whole is now vulcanized in the usual manner with the aid of any one of the usual moulds employed for that stage.

The vulcanization having been finished, the bandage $d$ is cut through at the places where it covers and closes the apertures $a'$ of the metal-ring $a$, and now the shaping bodies $c$ are removed through these apertures, first the central part $c^1$ of each thereof, then one of the lateral parts $c^2$, and finally the other lateral part $c^2$, as already mentioned at an earlier part of this specification. Finally, also the ledge-like members $m$ are removed through the apertures $a'$. These members are preferably stepped in the manner shown in Figures 3 and 5. Their dimensions are such that they can be removed through said apertures without any difficulty.

It is obvious that the shaping members $c$ (or $c^2$, $c^1$, $c^2$ respectively) leave behind them chambers in the tire, and that these chambers $i$ communicate with each other through the channels left behind by the stepped members or ledge-parts $m$. The bandage $d$ and the outer cover $s$ have been pierced at the places where the projections $k$ of the parts $c^2$ of the shaping bodies $c$ project forth therefrom, and when the parts $c^2$ are withdrawn, the projections $k$ leave behind them funnel-shaped passages $o^2$, Figure 5. The chambers $i$ communicate, thus, with each other through the channels or grooves $b^1$ of the rubber-pieces $b$, and with the atmosphere through their bottom-apertures $a'$, as well as through the lateral apertures $o^2$. There takes place while the tire is running a continuous exchange of the air contained in the tire chambers, the air being driven out and sucked in in regular intervals, in conformity with the revolutions of the wheel, each chamber being, therefore, thoroughly scavenged and the entire tire being thoroughly cooled.

The dimensions of the apertures $a'$ in the metal-ring may be such that it is rendered possible to introduce and manipulate nuts for securing in place non-skid rivets $u$ (Figure 10) or the like.

The rubber-pieces $b$ which, in the arrangement illustrated in Figures 3, 5, and 11, extend in planes passing through the axle of the wheel, may be located also obliquely thereto, as shown in Figure 12, and each of said pieces may be angular in itself, as illustrated in Figure 13. It is a matter of course that the configuration of the shaping bodies $c$ corresponds to that of said rubber pieces, as appears also from said Figures 12 and 13. The strength of the tire is still more increased by arrangements of the kind shown in Figures 12 and 13, as are also its resistibility and its supporting capacity in the state of rest.

It is not essential that the shaping bodies $c$ consist of a solid material and are composed of several pieces, for instance such as $c^2$, $c^1$, $c^2$. Also their shape need not be exactly that shown in the drawings. It is, however, essential that they render it possible to produce chambers in the tire, between the rubber pieces $b$, and in view of this object they may consist of an easily mouldable substance which can be broken to pieces after the vulcanization of the tire, or can be squeezed into such particles as can be removed through the apertures $a'$. Gypsum, or plaster of Paris respectively, is, for instance, a suitable material, but it is sufficient, in fact, to employ an equivalent material solely for the lateral members $c^2$ of the shaping bodies, whereas the central member $c^1$ may consist of a suitable metal and can be used, therefore, over and over again. If all parts of a shaping body $c$ consist of a solid material, it is a matter of course that the size of the apertures $a'$ is such that removing said parts can proceed without any difficulty whatever.

It is also not indispensably requisite that the pieces $b$ consist entirely or solely of rubber. They may be composed, if desired or preferred, of rubber and of layers of fabric, as illustrated, by way of example, in Figures 16 and 17 in which $x$ denotes a plurality of layers of fabric. The lateral passages $o^2$ (Fig. 14) are in this case dispensed with, but there are more inner communications between the chamber $i$. There is in each rubber piece $b$ a bore $b^3$ (Figs. 16 and 17) and the breadth of the layers of fabric $x$ is such that lateral channels or passages $b^4$ remain. The consecutive chambers communicate, thus, with each other at $b^2$, $b^3$, and $b^4$.

The convolutions of the bandage $d$ need not at any rate touch each other, as the convolutions $d$ in Figures 1 and 2 and in the middle part of Figure 3, but there may remain a spirally-shaped space or gap $S'$ (Fig. 17) which is filled up with rubber during the vulcanization phase whereby the rubber and the bandage are more intimately secured in place relatively to each other.

Concerning, finally, Figures $6^a$, $6^b$, and $6^c$, these relate to means for storing the flexible rubber-bar A (Fig. 7) and the flexible outer cover $s$ (Fig. 6) prior to using them for the manufacture of the tire, said means having for their object presenting the two rubber parts in a particularly convenient manner for severing off pieces of such length as required for the tire to be made. $v$ (Fig. $6^a$) is a rotary drum having a spirally-shaped bulge $v'$ on which the hollow outer cover $s$ is wound in the manner illustrated in the lefthand half of Figure $6^a$ and (in enlarged scale) in Fig. $6^b$. The cover is drawn off the drum, or its spiral-bulge respectively, in such lengths as are required for the tire. Similarly, the rubber-bar A (Fig. 7) is wound into a spirally-shaped groove $w'$ of a roller or drum $w$, and the pieces $b$ (Fig. 7) are cut off as required.

I claim:

1. The method of manufacturing self-cooling tires, consisting in attaching spaced rubber-pieces to a metallic ring having spaced apertures around its circumference, said rubber-pieces being arranged between said apertures; filling up the spaces between the rubber-pieces with shaping bodies adapted to be removed later on through the apertures of the metal-ring; applying an outer cover onto the rubber pieces and the filling-bodies, vulcanizing it, and removing the said shaping bodies through the said apertures of the metal-ring, as set forth.

2. The method of manufacturing self-cooling tires consisting in attaching spaced rubber-pieces to a metallic ring having spaced apertures around its circumference, said rubber-pieces being arranged between said apertures; filling up the spaces between the rubber-pieces with shaping bodies adapted to be removed later on through the apertures of the metal ring; winding a bandage-forming strip around the rubber-pieces and the shaping bodies; applying an outer cover onto said bandage and vulcanizing it; providing apertures in the bandage at the places of the apertures in the metal-ring, and withdrawing the said shaping-bodies through the said apertures, as set forth.

3. The method of manufacturing self-cooling tires consisting in providing a metal-strip with equally spaced apertures; forming a ring of said strip; attaching rubber pieces to the outer circumferential surface of the metal-ring, between said apertures; filling up the spaces between the rubber-pieces with shaping bodies adapted to be removed later on through the apertures of the metal-ring;

applying an outer cover onto the rubber pieces and the filling-bodies, vulcanizing it, and removing the said shaping bodies through the said apertures of the metal-ring, as set forth.

4. The method of manufacturing self-cooling tires consisting in attaching spaced rubber-pieces having each a groove in its outermost part to a metal-ring having spaced apertures around its circumference, said rubber-pieces being arranged between said apertures; filling up the spaces between the rubber-pieces with shaping bodies having also each a groove in its outermost part and being adapted to be removed later on through the apertures of the metal-ring; all said grooves forming one circumferential groove around the alternating rubber-pieces and shaping-bodies; filling up said circumferential groove with ledge-like members also adapted to be removed later on through the said apertures; winding a bandage-forming strip around the rubber-pieces and the shaping bodies; applying an outer cover onto said bandage and vulcanizing it; providing apertures in the bandage at the places of the apertures in the metal-ring, and withdrawing the said shaping-bodies, as well as said ledge-like members through the apertures of the metal-strip, as set forth.

5. The method of manufacturing self-cooling tires consisting in attaching spaced rubber-pieces to a metallic ring having spaced apertures around its circumference, said rubber-pieces being arranged between said apertures; filling up the spaces between the rubber-pieces with shaping bodies having each a projection at its two outer faces and being adapted to be removed later on through the apertures of the metal ring; winding a bandage-forming strip around the rubber pieces and the shaping bodies and causing said lateral projections to extend outwards through this strip; applying an outer cover onto said bandage, causing the said lateral projections to extend outwards also therethrough, and vulcanizing it; providing apertures in the metal-ring, and withdrawing the said shaping-bodies through the said apertures, as set forth.

6. The method of manufacturing self-cooling tires consisting in attaching to a metal-ring having equally spaced apertures individually arranged bodies composed of a foot consisting of rubber, and of layers of a fabric carried by said foot, said bodies being arranged between said apertures; filling up the spaces between the rubber-pieces with shaping bodies adapted to be removed later on through the apertures of the metal ring; winding a bandage-forming strip around the alternating bodies surrounding the metal-ring; applying an outer cover onto said bandage and vulcanizing it; providing apertures in the bandage at the places of the apertures in the metal-ring, and withdrawing the said shaping-bodies through the said apertures, as set forth.

7. The method of manufacturing self-cooling tires consisting in providing a metal-strip with equally spaced apertures; forming a ring of said strip; attaching rubber pieces having each a groove in its outermost part to the outer circumferential surface of the metal-ring between said apertures; filling up the spaces between said rubber bodies with shaping bodies having also each a groove in its outermost part and a projection on each of its two outer faces, and being adapted to be removed later on through the apertures of the metal-ring; winding a bandage-forming strip around the rubber pieces and the shaping bodies and causing said lateral projections to extend outwards through this strip; applying an outer cover onto said bandage, causing the said lateral projections to extend outwards also therethrough, and vulcanizing it; providing apertures in the metal-ring, and withdrawing the said shaping-bodies through the said apertures, as set forth.

In witness whereof I have hereunto set my hand.

KUNO SCHRAGIN.